(No Model.)

W. F. WILLIAMSON.
COMBINED TONGS AND PINCHERS.

No. 463,563. Patented Nov. 17, 1891.

Witnesses
Samuel Ker
H. F. Riley

Inventor
William F. Williamson
By his Attorneys,
C. A. Snow & Co.

UNITED STATES PATENT OFFICE.

WILLIAM F. WILLIAMSON, OF NEWPORT NEWS, VIRGINIA.

COMBINED TONGS AND PINCHERS.

SPECIFICATION forming part of Letters Patent No. 463,563, dated November 17, 1891.

Application filed May 23, 1890. Serial No. 352,931. (No model.)

*To all whom it may concern:*

Be it known that I, WILLIAM F. WILLIAMSON, a citizen of the United States, residing at Newport News, in the county of Warwick and State of Virginia, have invented a new and useful Combined Tongs and Pinchers, of which the following is a specification.

The invention relates to improvements in combined tongs and pinchers.

The object of the present invention is to provide a simple and inexpensive stove-tool adapted to be readily used as a pair of tongs and capable of adjustment to serve as pinchers, and when used as such to present flat jaws for clamping.

The invention consists in the construction and novel combination and arrangement of parts hereinafter fully described, illustrated in the accompanying drawings, and pointed out in the claims hereto appended.

Figure 1:
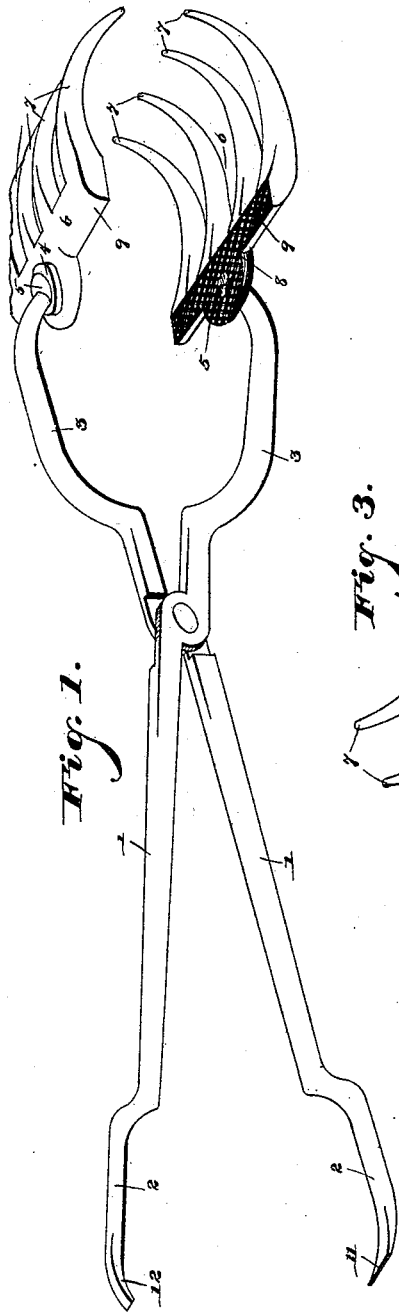
Figure 3:
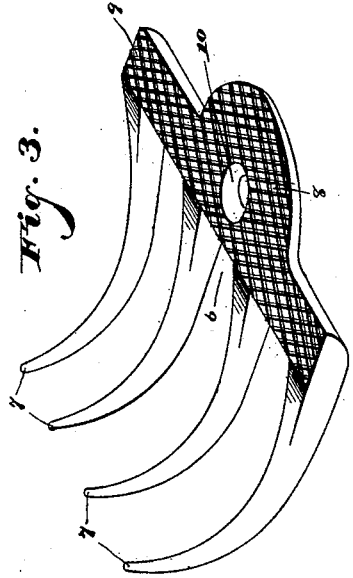
Figure 2:
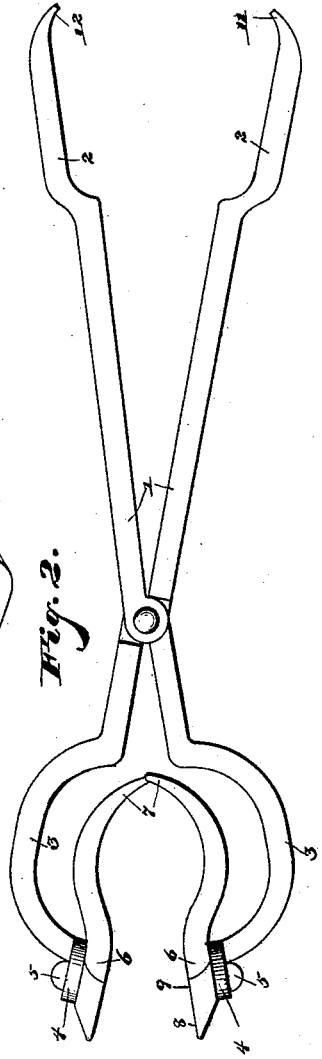

In the drawings, Figure 1 is a perspective view, the jaws being in position to form tongs. Fig. 2 is a side elevation, the jaws being in position to present a flat surface and form pinchers. Fig. 3 is a detail perspective view of one of the jaws.

Referring to the accompanying drawings, 1 designates the arms or shanks of a pair of tongs pivoted together intermediate of their ends in the usual manner and provided at one end with handles 2, and having their other ends 3 oppositely and outwardly curved and forming an approximately circular end when the arms or shanks are closed. The ends 3 are provided with eyes 4, through which pass pivots 5, that secure jaws 6 to the inner faces of the eyes 4 and permit the jaws to turn to present their tines or points 7 or their flat surfaces 8 to form a pair of tongs or pinchers, as is desired. The jaws 6 consist of a series of tines, fingers, or points 7, extending at intervals from a cross-bar 9, and enlargement or pincher-extension 8, formed integral with the fingers, points, or tines and the cross-bar and arranged upon the opposite side of the latter. The enlargements or extensions that are formed integral with the cross-bar and tines or fingers have their inner opposed surfaces flat and adapted to serve as a pair of pinchers, and they are provided with perforations 10, through which the pivots 5 pass that secure the jaws to the arms or shanks of the tongs. The outwardly-curved ends 3 provide between them a space which permits the jaws to turn entirely upon their pivots, and the jaws may be used as ordinary tongs, and the fingers or points of one jaw are arranged opposite the intervals of the fingers or points of the other jaw, which construction permits the jaws to close entirely to bring the flat surfaces of the cross-bars and extensions into contact, and the upper portion of the curved points or fingers may readily clamp the shaking-bar of a grate.

It will readily be seen that the device is simple and inexpensive in construction and is capable of being used either as tongs or pinchers, and presents a very useful tool. The enlargements or extensions have their inner opposite faces grooved, serrated, or otherwise roughened to enable a firm grip to be given by the pinchers. The handles 2 have flattened and slightly inwardly-bent ends 11 and 12, forming lifters, the former of which is wide and is adapted to engage the recess of large covers, and the end 12 is narrower to fit the recesses of small covers.

From the foregoing description and the accompanying drawings the construction, operation, and advantages of the invention will readily be seen.

What I claim is—

1. A combined tongs and pinchers consisting of the arms or shanks pivoted together and provided with the outwardly-curved ends 3 and having the eyes 4, the reversible jaws consisting of a series of fingers or points, the cross-bars connecting the fingers or points, and the pincher-extensions 8, having flat inner opposed faces and provided with perforations, and the pivots passing through the perforations and eyes and securing the jaws to the ends 3, substantially as described.

2. In a combined tongs and pinchers, the arms or shanks 1, terminating in handles, and the pivoted reversible jaws 6, formed at one end with the tines or fingers to serve as a pair of tongs and having the opposite sides shaped to serve as pinchers, as set forth.

In testimony that I claim the foregoing as my own I have hereto affixed my signature in presence of two witnesses.

WILLIAM F. WILLIAMSON.

Witnesses:
ENOCH CLAYTON,
R. G. CURTIS.